United States Patent

Schroeder et al.

[11] 4,230,918
[45] Oct. 28, 1980

[54] VEHICLE WINDOW GLASS BREAKAGE DETECTOR

[75] Inventors: Thaddeus Schroeder, Sterling Heights, Mich.; Norman L. Traub, Cortland, Ohio

[73] Assignee: General Motors Corporation, Detroit, Mich.

[21] Appl. No.: 967,632

[22] Filed: Dec. 8, 1978

[51] Int. Cl.³ .............................................. H01H 3/16
[52] U.S. Cl. ................................ 200/61.62; 200/300; 340/545
[58] Field of Search ............... 200/61.62, 61.08, 61.44, 200/61.76, 61.93, 300; 340/545, 550

[56] References Cited
U.S. PATENT DOCUMENTS

| | | | |
|---|---|---|---|
| 2,209,527 | 7/1940 | Knudsen | 340/550 |
| 2,763,745 | 9/1956 | Watts | 200/61.93 X |
| 3,693,150 | 9/1972 | Daniels | 200/61.44 |

Primary Examiner—J. V. Truhe
Assistant Examiner—Morris Ginsburg
Attorney, Agent, or Firm—Warren D. Hill

[57] ABSTRACT

Motor vehicle windows are commonly made of a tempered glass which shatters over its entire area whenever any part of the window is broken. Further, such windows are generally supported at the bottom edge by a channel which extends only part way along the glass leaving an unsupported part of the glass. A switch in the vehicle door is arranged to be held open by the glass and to exert a force against the glass so that if it becomes shattered, the switch force pushes the glass out of the way allowing switch closure. The entire switch is secured to the unsupported edge of the glass or alternatively the switch is mounted on the door panel and only an actuator is secured to the glass.

5 Claims, 6 Drawing Figures

VEHICLE WINDOW GLASS BREAKAGE DETECTOR

This invention relates to a glass breakage detector and particularly to such a detector useful for a vehicle window.

To help protect against vehicle theft, it is desirable to detect breakage of vehicle window glass so that an alarm may be given in response to the detection. It is desirable that such a glass breakage detector be easily installed and inexpensive. It is further desirable that such a detector be applicable to fixed as well as movable windows.

It has previously been proposed to sense the presence of a vehicle glass by a detector having a feeler to actuate a switch when glass is absent. Thus, even though a window is broken at a point remote from the detector, the detector will not necessarily be tripped. Further, such prior detectors were located in visible region thereby detracting from the aesthetic appeal of the vehicle.

It is, therefore, a general object of the invention to provide a detector sensitive to vehicle window breakage even though the breakage occurs in an area remote from the detector.

It is a further object to provide such a detector which is concealed from view.

The invention is carried out by providing a switch mechanism in the interior of a vehicle door and an actuator element secured to the glass at an unsupported edge, the glass being of a tempered type which shatters throughout its extent whenever broken at any point, the switch including a spring force applied to the glass through the actuator element to move the glass out of the way when broken to affect switch actuation.

The above and other advantages will be made more apparent from the following specification taken in conjunction with the accompanying drawings wherein like reference numerals refer to like parts and wherein.

Figure 1:
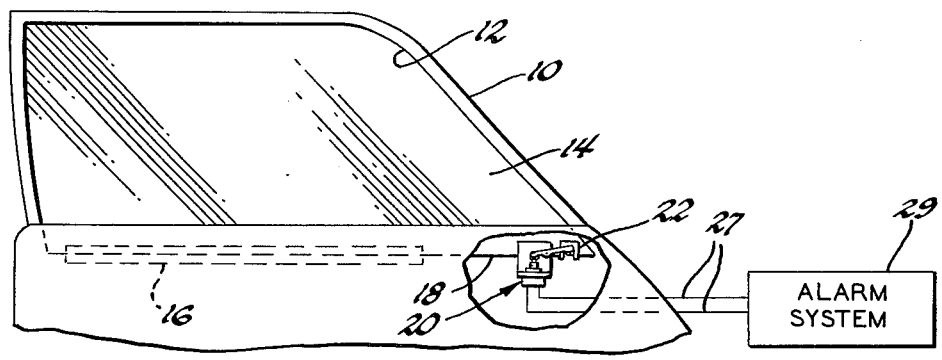
FIG. 1 is a partly broken away view of a vehicle door with a window breakage detector including a switch and an actuator according to the invention mounted thereon.
Figure 2:
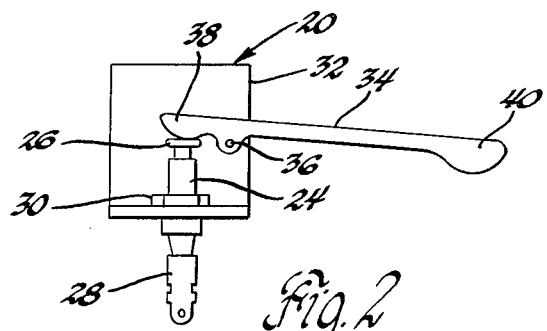
FIG. 2 is a detailed view of the switch of FIG. 1.

Referring to FIG. 1, a vehicle door 10 has a window opening 12 fitted with window glass 14 after the conventional manner. The glass 14 extends beyond the lower edge of the window opening into the door interior. There the glass is supported by a bracket or channel 16 which in the case of a movable window is raised and lowered by a window actuator, not shown, and in the case of a nonmovable window is fixed to the interior of a door panel. In either case, the channel 16 extends over part of the lower edge of the glass 14 and leaves a glass edge portion 18 unsupported. The window glass itself is a solid tempered glass which has a characteristic that when broken in any area it shatters throughout its whole extent into small blunt pieces. The glass then containing many fracture lines is readily moved out of its normal position particularly along the unsupported portion 18. As indicated in a cut-out portion of FIG. 1 and as revealed more clearly in FIGS. 2 and 3, a window breakage detector incorporates a switch 20 mounted to an inner panel of the door below the window opening so as to be completely hidden from view and is in the area of the unsupported portion 18 of the glass when the window is inclosed or substantially closed position. The window breakage detector further includes an actuator 22 secured to the lower edge of the window at the unsupported portion 18 to engage the switch when the window is intact and inclosed or substantially closed position.

The switch 20 comprises as its essential switching element a door jam switch 24 of the type typically used to control the actuation of interior lights upon the opening of a vehicle door. The switch 24 includes a push button 26 which is biased outwardly by an interior spring, not shown. In the absence of any force applied to the push button 26, the switch is closed and when the push button 26 is depressed, the switch is open. The switch includes terminals 28 connected to lead wire 27 which extend to an alarm system 29 (FIG. 1). The alarm system is preferably a type which is armed only when the vehicle is not in operation. A threaded fastener 30 secures the switch to a mounting bracket 32. The bracket, in turn, is secured to the inside of a door panel by welding or other fastening techniques. a lever 34 is mounted on the bracket 32 by a pivot 36 intermediate its ends. One end 38 of the lever bears on the push button 26 of the switch 24 while the other end 40 of the lever is arranged to contact the actuator 22. The length of the lever arm between the end 40 and the pivot is much greater than the distance between the end 38 and the pivot so that a large travel of the end 40 results in a small travel of the push button 26.

Figure 3:
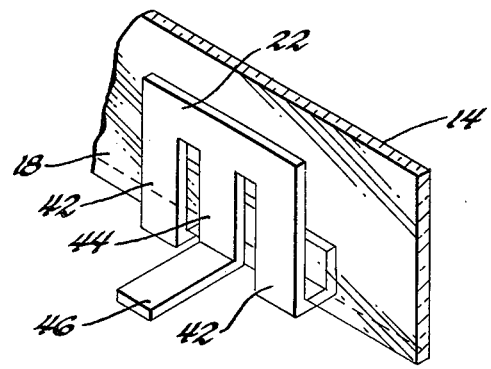
FIG. 3 is a detailed view of an actuator mounted on the glass according to the embodiment of FIG. 1.

As shown in FIG. 3, the actuator 22 comprises a spring clip which securely engages the lower edge of the glass 14. The clip is formed from an E-shaped blank having its outer legs 42 bent in a U-shape to tightly receive the edge of the glass 14 while the central leg 44 of the blank is bent at a right angle from the plane of the glass to provide a pin 46 which engages the end 40 of the lever 34.

In operation, when the window is closed, the pin 46 pushes up on the end 40 of the lever 34 to cause depression of the push button 26 so that the switch 24 will be open. If the glass is broken somewhere in the window opening 12, the whole sheet of glass will be shattered thereby weakening the portion 18 of the glass to which the actuator 22 is attached. The force of the switch spring acting through the push button 26, the lever 34 and the actuator 22 pushes the actuator and its surrounding glass out of the way thereby allowing the switch to close thereby tripping the alarm system.

In the case of a movable window if the window is open, the actuator 22 will not engage the lever 34 so that the switch 24 will be closed. If the vehicle operator arms the alarm system when the window is open, the alarm will be energized to warn the operator that the window is left open. Thus, a dual purpose is served by the detector. In order to allow ventilation of the vehicle while it is parked the switch may be arranged to allow the window to be open by about on inch without closing the switch. The long travel of the end 40 of the lever arm makes that feature practical.

Figure 4:
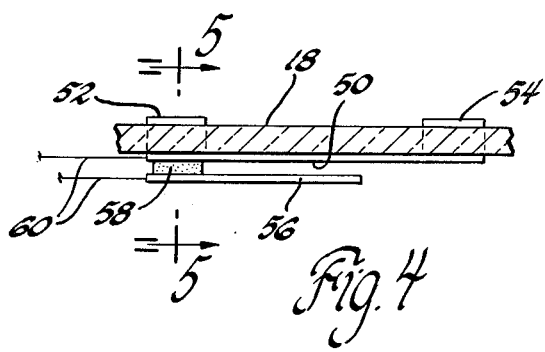
FIG. 4 is a plan view of a second embodiment of a window breakage detector according to the invention.
Figure 5:
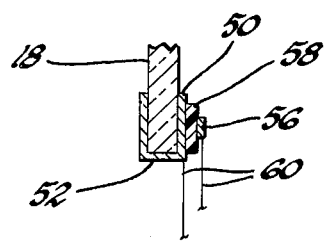
FIG. 5 is a view of a detector of FIG. 4 taken along lines 5—5.
Figure 6:
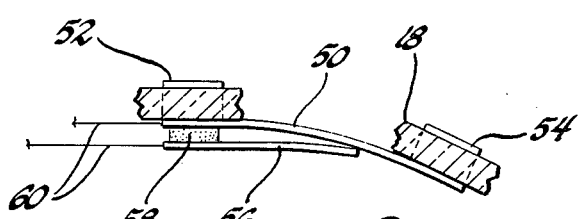
FIG. 6 is a view of the window breakage detector of FIG. 4 shown in its actuated broken glass position.

A second embodiment of the invention in the form of a clip switch is shown in FIGS. 4, 5 and 6. A metallic leaf spring 50, which is normally cureved when relaxed as shown in FIG. 6, has a spring clip 52 and 54 integrally formed at each end respectively. Each spring clip is formed in a U-shaped section and fits in secure engagement around the lower edge of the unsupported glass portion 18. The clip 52 is the principle switch mounting element while the clip 54 serves as a switch actuator. When the glass is intact, as shown in FIG. 4, the leaf spring 50 is constrained into a planar configuration lying flat against the glass portion 18 and thus is under load. The spring rate of the leaf spring 50 can be selected to apply a rather large force to the glass portion 18 but not large enough to break a sound window. A conductive finger 56 is mounted at one end through an insulated mounting 58 to the spring clip 52. The finger 56 extends parallel to the leaf spring 50 and is normally spaced therefrom. A pair of lead wires 60 from an alarm system are attached to the spring clip and the finger 56 so that those two elements serve as switch contacts which are open when the glass 18 is intact. When, however, as shown in FIG. 6, glass breakage occurs, the force of the spring 50 pushes the glass gripped by the clip 54 from the plane of the glass pane and the spring clip 50 assumes its curved position, the finger 56 then engages the leaf spring 50 thereby closing the switch contacts to energize the alarm. This embodiment of the invention is inexpensive and easy to install since it merely needs to be clipped to the edge of a window glass. It is particularly appropriate for use with the windows which are not movable since in that case the wires 60 are stationary. It is possible, however, to use the clip switch on a movable window although the wires must be routed to avoid breakage due to window movement. This is a passive type detector which is always ready for detection of glass breakage irrespective of the degree of window closure and it does not provide a detection of a window being left open.

It will thus be seen that according to this invention there are provided glass breakage detectors which are inexpensive, easy to install and effective when used with solid tempered glass to sense breakage even though the initial break occurred at some distance from the detector.

The embodiments of the invention in which an exclusive property or privilege is claimed are defined as follows:

1. In combination, a glass breakage detector, a window glass in a vehicle door having an edge of the window glass extending into the door interior and support means engaging a portion of the said edge such that part of the glass edge is unsupported, the glass comprising a tempered glass which cracks into small pieces throughout its extent when the glass is broken, comprising
  a switch mounted in the door interior and positioned adjacent the said edge of the window glass,
  an actuator coupled to the switch and secured to the unsupported part of the glass edge and effective when moved to actuate the switch, the switch being effective through the actuator to apply a force to the glass to cause movement of the glass, when broken, and cause the actuator to move and actuate the switch.

2. In combination, a glass breakage detector, a window glass in a vehicle door having an edge of the window glass extending into the door interior and support means engaging a portion of the said edge such that part of the glass edge is unsupported, the glass comprising a tempered glass which cracks into small pieces when the glass is broken, comprising
  a switch mounted in the door interior and secured by a fastener to the said edge of the window glass, said switch having a leaf spring secured at one end to the fastener and extending along the said edge,
  an actuator comprising a clip secured to the unsupported part of the glass edge and coupled to the switch at the other end of the leaf spring so that the leaf spring is loaded to apply a force to the glass to cause movement of the glass, when broken, and cause the actuator to move and actuate the switch.

3. In combination, a glass breakage detector, a window glass in a vehicle door having an edge of the window glass extending into the door interior and support means engaging a portion of the said edge such that part of the glass edge is unsupported, the glass comprising a tempered glass which cracks into small pieces when the glass is broken, comprising
  a switch mounted in the door interior and having a normally curved leaf spring stressed into a substantially straight configuration and having at each end an integral clip secured to the unsupported part of the glass edge, the switch further having a finger extending parallel to the leaf spring, when straight, and fastened through an insulating mount to one of the clips so that the leaf spring and the finger comprise two switch contacts whereby the leaf spring applies a force to the glass to cause movement of the glass, when broken, and movement of the leaf spring into its normal curved configuration to make contct with the finger and thus actuate the switch.

4. In combination, a glass breakage detector, a window glass in a vehicle door having an edge of the window glass extending into the door interior and support means engaging a portion of the said edge such that part of the glass edge is unsupported, the glass comprising a tempered glass which cracks into small pieces when the glass is broken, comprising
  a push button switch mounted on the door in the door interior and positioned adjacent the said edge of the window glass, said switch including a spring for biasing the push button outwardly,
  an actuator secured to the unsupported part of the glass edge for movement therewith, and linkage means coupling the actuator to the push button for transmitting force between the push button and the actuator to apply a force to the glass to cause movement of the glass, when broken, and cause the actuator to move and actuate the switch through the linkage means.

5. In combination, a glass breakage detector, a window glass movable between open and closed positions in a vehicle door having an edge of the window glass extending into the door interior and support means engaging a portion of the said edge such that part of the glass edge is unsupported, the glass comprising a tempered glass which cracks into small pieces when the glass in broken, comprising
  a push button switch mounted on the door in the door interior and positioned adjacent the said edge of the window glass when the window is substantially closed, said switch including a spring for biasing the push button outwardly,
  an actuator secured to the unsupported part of the glass edge for movement therewith, and a lever coupling the actuator to the push button when the window is substantially closed for transmitting force between the push button and the actuator to apply a force to the glass to cause movement of the glass, when broken, and cause the actuator to move and actuate the switch through the lever.

* * * * *